US005642360A

United States Patent [19]

Trainin

[11] Patent Number: 5,642,360
[45] Date of Patent: Jun. 24, 1997

[54] SYSTEM AND METHOD FOR IMPROVING NETWORK PERFORMANCE THROUGH INTER FRAME SPACING ADAPTATION

[76] Inventor: Solomon Trainin, 3/16 Strouma Street, Haifa 35708, Israel

[21] Appl. No.: 520,143

[22] Filed: Aug. 28, 1995

[51] Int. Cl.$^6$ ....................................... H04J 3/14
[52] U.S. Cl. .................. 370/230; 370/229; 370/232; 370/252; 370/465; 395/200.11; 395/200.13
[58] Field of Search ............... 370/79, 85.3, 93, 370/94.1, 17, 229, 230, 232, 252, 465; 395/200.06, 200.11, 200.13

[56] References Cited

U.S. PATENT DOCUMENTS

| | | | |
|---|---|---|---|
| 4,860,006 | 8/1989 | Barall | 370/85.3 |
| 5,319,641 | 6/1994 | Fridrich et al. | 370/85.3 |
| 5,369,639 | 11/1994 | Kamerman et al. | 370/85.3 |
| 5,404,353 | 4/1995 | Ben-Michael et al. | 370/235 |
| 5,418,784 | 5/1995 | Ramakrishnan et al. | 370/85.3 |
| 5,422,887 | 6/1995 | Diepstraten et al. | 370/85.3 |
| 5,436,903 | 7/1995 | Yang et al. | 370/85.3 |
| 5,446,735 | 8/1995 | Tobayi et al. | 370/85.3 |
| 5,568,469 | 10/1996 | Sherer et al. | 370/17 |

*Primary Examiner*—Kenneth S. Kim

[57] ABSTRACT

An Inter Frame Spacing ("IFS") adaptation routine, operating in combination with a network controller, to alter the IFS parameter utilized by the network controller to regulate data throughput. Such alteration is performed in real-time according to the topology and load of its Ethernet network. Upon determining that current Back-to-Back frames of data propagating through the Ethernet network are sensitive to IFS adaptation, the IFS adaptation routine configures the IFS parameter of its network controller based on its transmit activity and collision intensity.

17 Claims, 7 Drawing Sheets

SYSTEM AND METHOD FOR IMPROVING NETWORK PERFORMANCE THROUGH INTER FRAME SPACING ADAPTATION

BACKGROUND OF THE INVENTION

1. Field of the Invention

The present invention relates to the field of data transfer through an Ethernet network. More particularly, the present invention relates to a system and method for real-time modification of Inter Frame Spacing associated with the Ethernet network to improve its overall performance.

2. Description of Art Related to the Invention

With the continual emergence of smaller, faster and more powerful computers, many businesses have implemented or are in the process of implementing decentralized networks such as local area networks ("LANs"). A LAN is a high-speed communications network which electrically connects a collection of stations (e.g., computers, servers, plotters or any other electronic network connective device) together. As a result, each user has control over his or her own station and has access to other stations coupled to the LAN. One well-known type of LAN is commonly referred to as an "Ethernet network".

Defined by IEEE Standard 802.3 (IEEE, 1993), the Ethernet network is a non-priority based network which possesses a bus supporting a limited bandwidth currently 10 million bits per second ("Mbps") and 100 Mbps. The IEEE 802.3 standard currently uses the Carrier Sense Multiple Access and Collision Detection ("CSMA/CD") access method which attempts to prevent collisions by using a carrier signal to indicate when a frame of data (i.e., "data frame") is being transmitted by a station. A "data frame" is a sequence of data bits of a preselected length.

If the carrier signal is asserted, a station requesting access to the Ethernet network monitors the carrier signal until it goes inactive and thereafter, waits at least a minimum Inter Frame Spacing ("IFS") delay which is 9.6 microseconds ("μs") for a 10 Mbps Ethernet network or 960 nanoseconds ("ns") for a 100 Mbps Ethernet before transmitting its data frame. This behavior is observed even when only one station is transmitting by requiring the station to wait until the IFS delay has expired before it can transmit another data frame. Therefore, the fastest possible data transmission, called a "Back-to-Back (BtB) transmit", occurs when successive transmits are separated by only an IFS delay.

A collision occurs when one or more stations attempt to transmit a data frame before a prior data transmission of other station is complete. For example, suppose two stations are connected to 10 Mbps Ethernet network having a propagation delay between stations greater than 9.6 μs. When the first station begins to transmit a data frame, the second station will receive an active carrier signal only after the propagation delay. However, if the second station is monitoring the carrier signal, it will start to transmit a data frame after 9.6 μs (i.e., a minimum IFS delay) which may inadvertently cause a collision to occur.

According to the IEEE 802.3, all stations whose data frames have collided must discontinue transmissions and wait a random number of "slot times" before attempting to re-transmit its data frame. A "slot time" is a maximum propagation delay for a signal to travel from a first station (e.g., a computer) of the Ethernet network to a second station (e.g., a server) and back to the first station via the bus of a maximum length supported by the Ethernet network. The "slot time" of the 10 Mbps Ethernet network is equal to 51.2 μs. Stations in contention that have chosen the same "random" number will experience another collision caused by re-transmission of its frame and perhaps future frame collisions. Moreover, it is contemplated that other stations, not originally in contention, may also cause collisions by attempting to transmit data frames after appropriate IFS delay.

Otherwise, if operating contrary to the guidance of IEEE 802.3, the Ethernet network may experience an unacceptably high data collision rate which reduces available bandwidth of the Ethernet network and leads to less than optimal performance. Likewise, increasing the IFS for a given Ethernet network configuration may temporarily reduce the number of data collisions experienced by the Ethernet network, however, it is contemplated that the IFS could be excessive in the event that traffic on the Ethernet network significantly decreases. This would also prevent the Ethernet network from achieving its optimal performance level.

Therefore, it would be advantageous to control the time value of IFS associated with the Ethernet network based on a number of factors such as network traffic and topology. It would be required, however, for such control to be "on the fly" or in real-time to support real-time data transmissions.

BRIEF SUMMARY OF THE INVENTION

The present invention relates to a system and method for altering an Inter Frame Spacing ("IFS") delay to improve performance of a network. The network includes a first station and a second station coupled together through a network medium. The operations of each station are regulated by a network controller, employed in each station, which alters the IFS delay to regulate data throughput experienced by the station.

The network controller receives the IFS delay from an IFS adaptation routine stored in a main memory element or in local memory associated with a network interface card coupling the station with the network medium. The IFS adaptation routine alters the IFS delay in real-time according to the topology and load of the network. This is accomplished by performing a number of steps to modify the IFS delay to optimize performance of the network. These steps include (i) calculating a transmit activity of the network; (ii) checking whether the transmit activity is greater than or equal to the transmit activity threshold. If the transmit activity is greater than or equal to the transmit activity threshold, then a collision intensity experienced by the network is calculated and the Inter Frame Spacing is adjusted by the IFS adaptation routine until the collision intensity rises above a collision intensity threshold. However, if the transmit activity is less than the transmit activity threshold, the Inter Frame Spacing is set to its minimal value.

BRIEF DESCRIPTION OF THE DRAWINGS

The features and advantages of the present invention will become apparent from the following detailed description of the present invention in which.

DETAILED DESCRIPTION OF THE INVENTION

The present invention describes an Inter Frame Spacing ("IFS") adaptation routine, operating in conjunction with hardware circuitry, which alters Inter Frame Spacing of a station of an Ethernet network based on its load and topology. The following description is presented largely in terms of flowcharts and graphs which are considered to be the most effective way to convey the substance of the present invention to those persons of ordinary skill in the art of network communications. The flowchart illustrates a series of steps leading to a desired result, although some well-known steps are not set forth in detail in order to avoid unnecessarily obscuring the present invention. These steps require physical manipulations of physical quantities in the form of electrical or magnetic signals capable of being stored, transferred, combined, compared or otherwise manipulated.

Some terminology is used to discuss certain well-known networking terms. For example, the term "topology" pertains to the distances between stations operating in the Ethernet network while the term "load" involves the overall traffic experienced by the Ethernet network including "transmit activity" and "collision intensity". "Transmit activity" represents the number of BtB frames that a station attempts to transmit in a single time period "T" which is equal to one second or any chosen duration of time. "Collision intensity" is defined as an integer portion of a ratio between the transmit activity and the number of frames in that time period that collided with one another. Collision intensity rises when the number of collided frames decreases, so if all the BtB frames are transmitted without collisions, the collision intensity reaches its maximum. The number of BtB frames and collided frames may be acquired from the LAN controller when processing Interrupt Service Routine of the station. Finally, "round-trip delay" is the propagation delay for a signal to travel between two stations of the Ethernet network.

Figure 1:
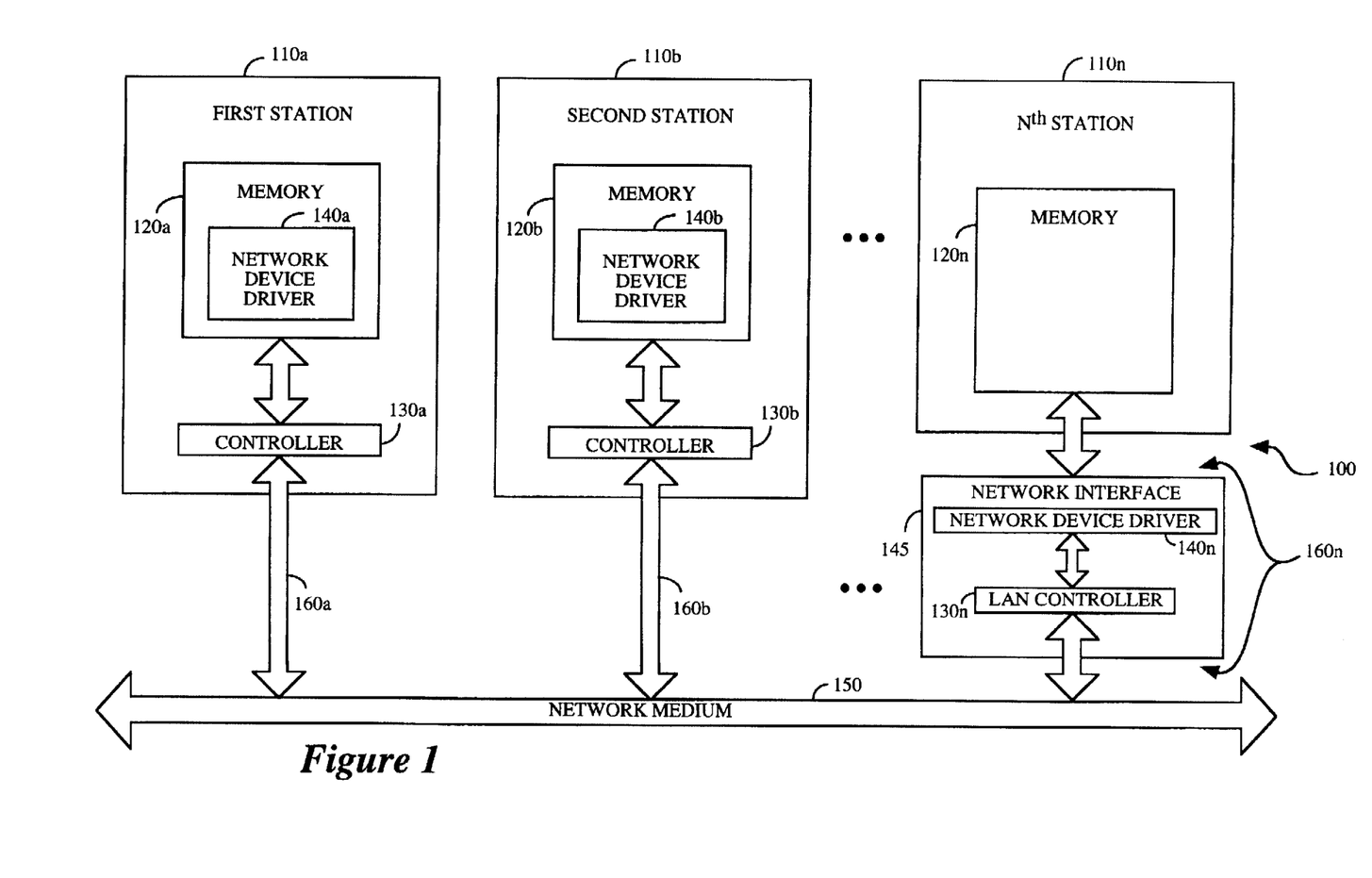
FIG. 1 is an illustrative block diagram of an Ethernet networking system implementing an interactive frame spacing ("IFS") adaptation routine within network driver software stored within internal memory of the station and alternatively a Network Interface Card ("NIC").

Referring to FIG. 1, an illustrative block diagram of an Ethernet network 100 employing the present invention is shown. The Ethernet network 100 comprises "N" stations 110a–110n (where "N" is an arbitrary whole number) connected through a well-known network medium 150 via bus lines 160a–160n. Each of these stations 110a–110n includes internal memory 120a–120n. Preferably, one of the stations, for example station 110n, is a server dedicated to working with one or more other stations.

Regardless of the particular network configuration, each of the stations preferably requires a network ("LAN") controller 130a–130n controlled by its corresponding network device driver which includes the IFS adaptation routine. The LAN controller 130a–130n is implemented, in Silicon, with circuitry necessary to alter the IFS in real-time. Examples of such LAN controllers 130a–130n currently available include i82595TX and i82595FX produced by Intel® Corporation of Santa Clara, Calif.; however, it is contemplated that other LAN controllers, currently used now or in the future, may include circuitry which enables the IFS adaptation routine to alter the IFS in real-time.

As shown in the first and second stations 110a and 110b of FIG. 1, one embodiment of the present invention is to employ the IFS adaptation routine as a part of network device drivers 140a and 140b within the internal memory 120a and 120b, respectively. Alternatively, another embodiment is to employ the IFS adaptation routine within a network interface (e.g., Network Interface Card) 145 as shown being used in this manner by the $N^{th}$ station 110n. Although many other embodiments are contemplated, the spirit and scope of the invention rests in creating the IFS adaptation routine with the ability to intelligently adjust in real-time IFS parameters used by the station's LAN controller to regulate data throughput of the Ethernet network.

Figure 2:
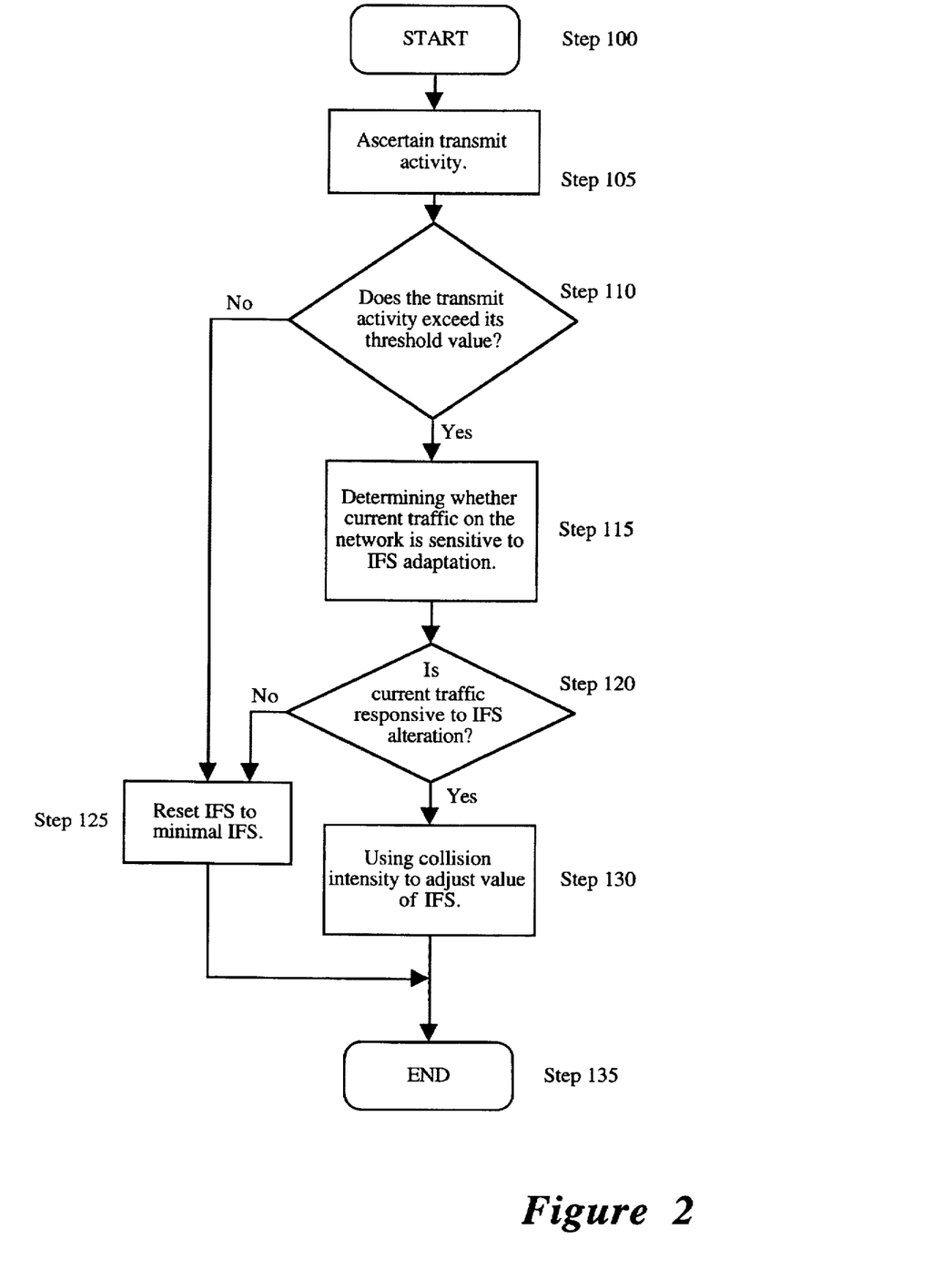
FIG. 2 is a general illustrative flowchart of primary steps followed by the IFS adaptation routine in setting the Inter Frame Spacing used by the network controller in optimizing performance of the Ethernet network.

Referring to FIG. 2, a general flowchart of the IFS adaptation routine for altering the IFS parameter which is used by a LAN controller, implemented within each station or network interface, to regulate that station's data throughput and collectively the data throughput of the Ethernet network. The primary goal of the IFS adaptation routine is to reduce the number of data collisions in order to enhance throughput of the Ethernet network by slightly adjusting the value of the IFS of one of the stations in contention. In the event that the IFS adaptation routine fails to improve performance of the Ethernet network, it guarantees that overall performance of the Ethernet network will remain at the same level as if the IFS adaptation routine had not been used by resetting the IFS parameter to its minimal value (9.6 µs for 10 Mbps Ethernet networks, 960 ns for 100 Mbps Ethernet networks, etc.). It is contemplated that the operations of the IFS adaptation routine could be emulated by specially configured hardware or software mechanisms.

As shown, the IFS adaptation routine performs a number of steps to modify the IFS of the Ethernet network to achieve optimal performance. First, in Step 105, transmit activity of the Ethernet network is calculated in order to decide when to start and stop the IFS adaptation routine. Preferably, as shown in Step 110, the IFS adaptation routine is started when the transmit activity exceeds a constant, predetermined transmit activity threshold Likewise, the IFS adaptation routine is stopped when the transmit activity falls below the transmit activity threshold and the IFS is set to its universal value (Steps 110 and 125).

Next, in Step 115, the IFS adaptation routine determines whether current traffic, normally BtB frames, propagating over the network medium are responsive to IFS alterations. Response can be ascertained through a number of methods, one of which is setting the IFS parameter equal to the slot time of the Ethernet network at a first time period and checking collision intensity of the Ethernet network at the next time period.

Upon detecting that there is a substantial increase in the collision intensity (Step 120), the BtB frames are considered sensitive to IFS adaptation and certain parameters such as transmit activity and collision intensity can be used to select the value of IFS. More specifically, the collision intensity is calculated and then used to adjust the IFS parameter utilized by the LAN controller (Step 130). Typically, the collision intensity is determined by taking an integer portion of a ratio of (i) the number of BtB frames that the station attempts to transmit in time period "T" and (ii) the number of collided frames in that time period. Preferably, adjustments to the IFS parameter are made based on comparisons between collision intensity and a constant, predetermined collision intensity threshold. The collision intensity threshold is preferably equal to "4" for a 10 Mbps Ethernet network. However, if there is no appreciable change in collision intensity, the IFS adaptation routine is stopped and the IFS is set to its minimal value as discussed above (Step 125).

Figure 3:
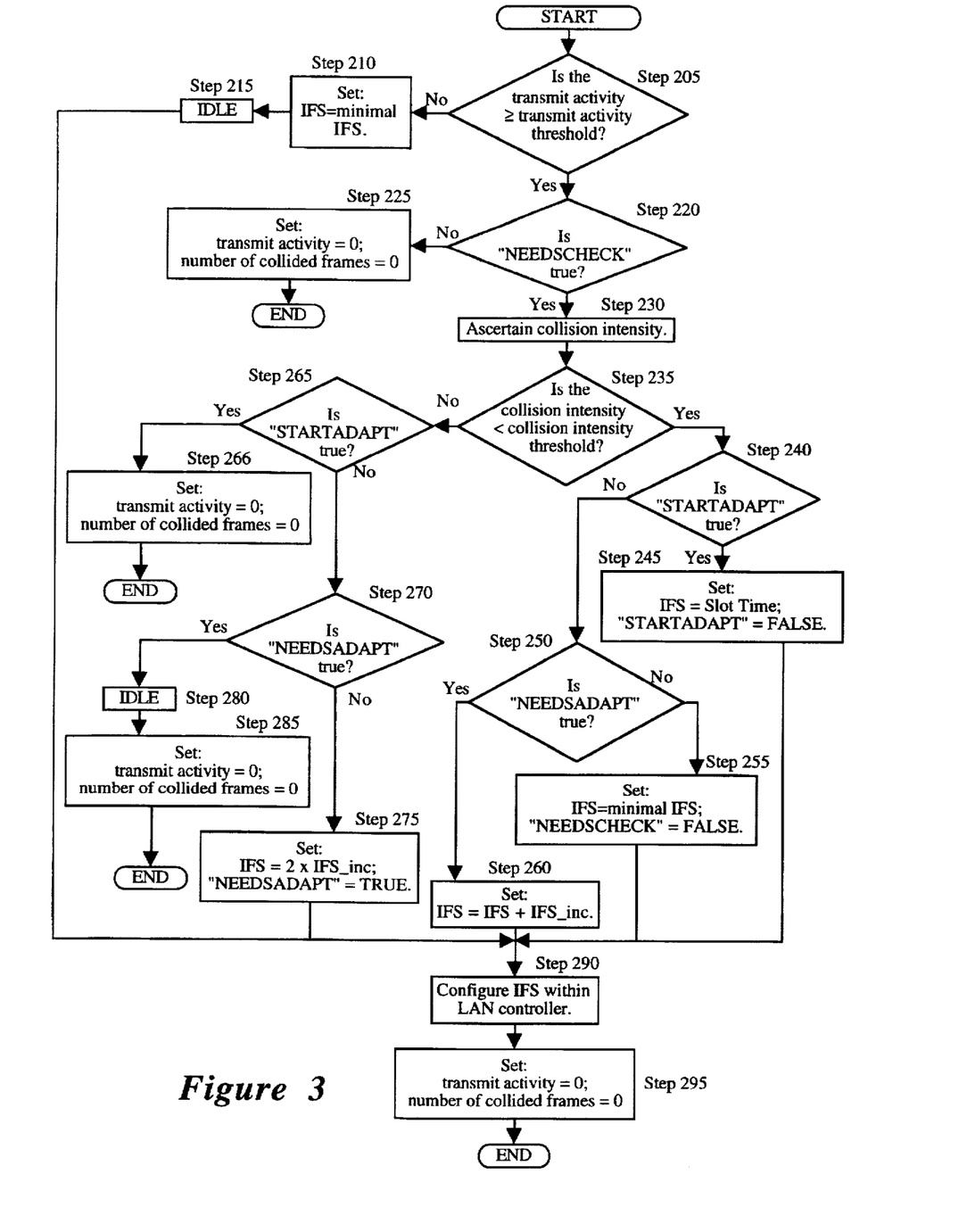
FIG. 3 is a detailed flowchart of a procedure followed by the IFS adaptation routine in setting the Inter Frame Spacing of the network controller in optimize performance of the Ethernet network.

Referring now to FIG. 3, a more detailed flowchart of an embodiment of the IFS adaptation routine used to control its associated LAN controller is illustrated. Each access to the IFS adaptation routine is performed every time period "T". The complete adaptation of IFS in reaching the round-trip delay for a given topology and load of the Ethernet network is accomplished through several accesses to the IFS adaptation routine. This routine relies on a plurality of switches (e.g., STARTADAPT, NEEDSADAPT and NEEDSCHECK switches) for deciding which steps to perform based on current transmit activity and collision intensity. The switches are used to store current state information which can be changed every access. The initial status of these switches in "Idle" state is the following: STARTADAPT="true", NEEDSADAPT="false" and NEEDSCHECK="true".

As shown in FIG. 3, in Step 205, the IFS adaptation routine determines whether the transmit activity is greater than or equal to the predetermined transmit activity threshold which is obtained for sources external to the IFS adaptation routine. If not, the IFS adaptation routine configures the IFS parameter of the LAN controller to its minimal value, returns to the above-identified switches to their "Idle" state and resets the transmit activity and the number of collided frames parameters as shown in Steps 210, 215, 290 and 295, respectively. If the transmit activity is greater than or equal to the transmit activity threshold, the IFS adaptation routine check the status of the NEEDSCHECK switch (Step 220). The NEEDSCHECK switch is set to "true" if there exists a need for IFS adaptation. However, the NEEDSCHECK switch is set to "false" if the collision intensity is not sensitive to the IFS adaptation causing the transmit activity and number of collided frames parameters to be reset before exiting the routine (Step 225).

Next, in Steps 230 and 235, the IFS adaptation routine calculates the collision intensity and then initially determines whether the collision intensity is less than its collision intensity threshold. If not, the IFS adaptation routine is not required and is exited since the STARTADAPT switch is "true" in the "Idle" state (Steps 265 and 266). However, if the collision intensity is less than its collision intensity threshold and STARTADAPT is "true" (Steps 235-240), this first access tests the collision sensitivity to IFS by setting IFS parameter equal to the slot time while setting the STARTADAPT switch to "false" (Step 245). Then, the newly modified IFS is transferred to the LAN controller and the transmit activity and number of collided frame parameters are reset before exiting (Steps 290 and 295). As shown, the switch values are not returned to their "Idle" state but retain their current state for use in a second or subsequent access.

In a second access of the IFS adaptation routine, a determination is made as to whether it is necessary to continue IFS adaptation by checking whether (i) the transmit activity is still greater than or equal to the transmit threshold and (ii) the NEEDSCHECK switch remains "true" (Steps 205 and 220). If such is the case, the IFS adaptation routine checks whether the collision intensity is greater than or equal to the collision intensity threshold which indicates that the current network load and topology were responsive to setting IFS equal to the slot time (Step 235). If the collision intensity has increased in number to be above the collision intensity threshold, as shown in Steps 265-275 the IFS adaptation routine sets IFS to be equal to a preselected IFS delay, such as two IFS delay increments "2×IFS_inc", which is equal to a constant, predetermined fraction of the slot time (e.g., one-eighth slot time). Furthermore, the IFS adaptation routine sets the NEEDSADAPT switch to "true" indicating that future IFS modification may be necessary.

However, if the collision intensity still remains below the collision threshold after setting IFS equal to the slot time, the IFS adaptation routine resets IFS back to its minimal value, sets the NEEDSCHECK switch to "false" and resets the transmit activity and number of collided frame parameters as shown through Steps 240, 250, 255, 290 and 295. This causes subsequent accesses of the IFS adaptation routine to be exited at Step 220.

In the third and following accesses, the IFS adaptation routine determines whether it is necessary to continue IFS adaptation (i.e., checks transmit activity and whether the NEEDSCHECK switch remains "true"). If so, the IFS adaptation routine checks whether the collision intensity is less than the collision intensity threshold when IFS is equal to the preselected IFS delay. If so, this indicates that further incrementation of the IFS parameter is necessary to achieve optimal performance. Since the STARTADAPT and NEEDSADAPT switches are "false" and "true" respectively, the IFS adaptation routine increments the IFS by another IFS delay increment, configures the IFS by transferring the new IFS value to the LAN controller and resets the transmit activity and number of collided frame parameters (Steps 240, 250, 260, 290 and 295). Thereafter, subsequent accesses will continue to increase the IFS by an IFS delay increment accordingly until the collision intensity rises above the collision intensity threshold where the switches are set to their "Idle" state as shown through Steps 265, 270 and 280. Thereafter, the newly calculated IFS is used until transmit activity falls below its transmit activity threshold or collision intensity falls below its collision intensity threshold.

Figure 4:
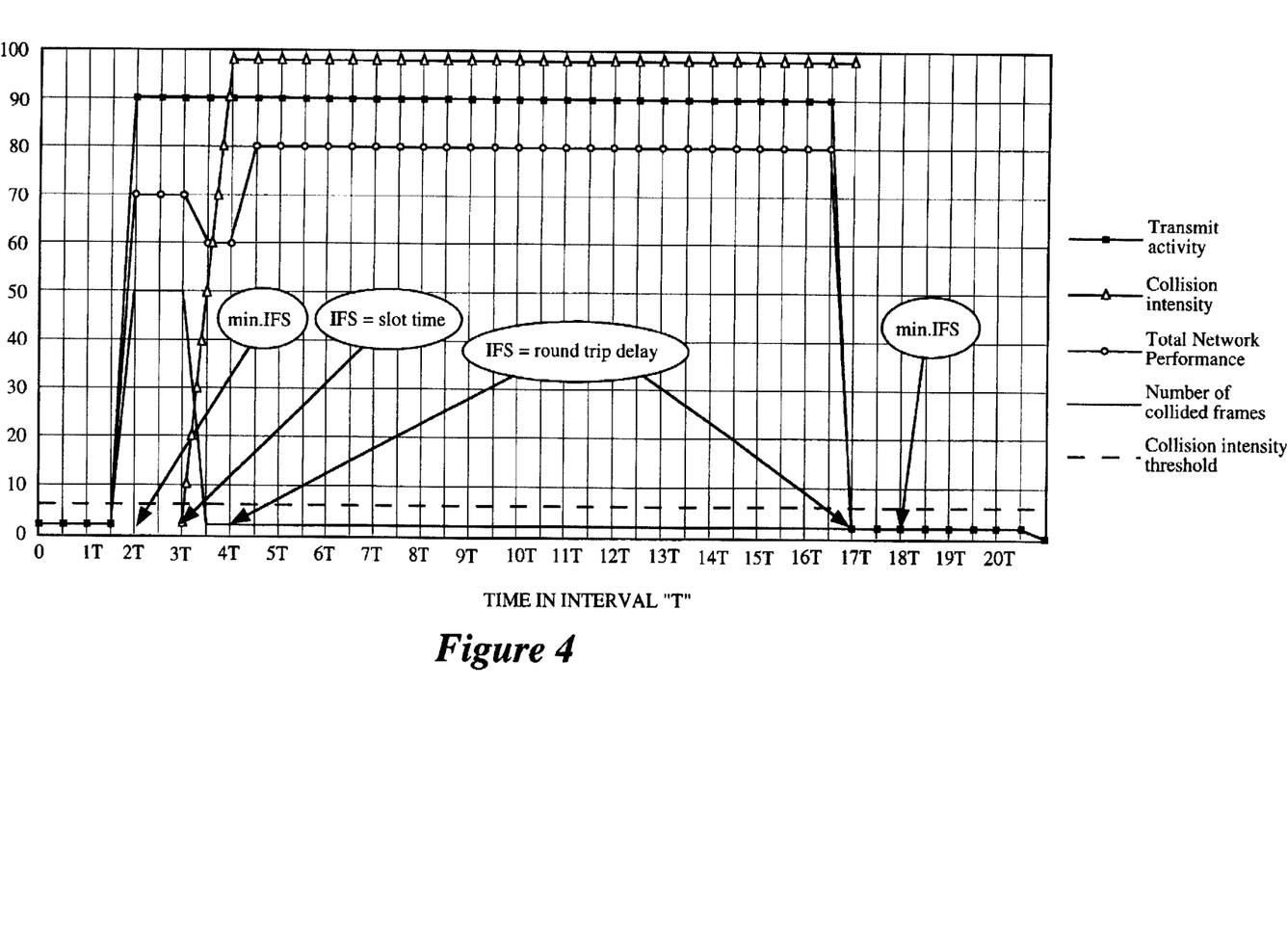
FIG. 4 is a detailed illustration of the operations of the IFS adaptation routine for an Ethernet network having a topology where the round trip delay between the first and second stations is equal to "2/m" multiplied by the slot time, where "1/m" is equal to the incremental IFS value.

Referring to FIG. 4, an illustrative graph of the IFS adaptation routine for an Ethernet network having a relatively short topology is shown where the round trip delay between a first station and a second station is equal to "2/m×slot time", where "m" is an arbitrary whole number (e.g., "8") and "1/m×slot time" is equal to the IFS delay increment. The Y-axis numbers are abstract and have only illustrative meaning. The transmit activity threshold is set to eighty (80) and the collision intensity threshold is set to five (5), although any values may be chosen. As shown at time period "2T", when the IFS is set to a minimum IFS delay while the transmit activity becomes more than 80 and the collision intensity falls below 5 respectively, the IFS adaptation routine starts at 3T and tests if the collision intensity is responsive to the IFS adjustment. Such testing is accomplished by setting the IFS equal to the slot time and determining at 4T whether the collision intensity has increased.

Since the collision intensity has increased above the collision intensity threshold at 4T as shown indicating that the network is responsive to IFS alteration, the IFS adaptation routine decides to alter the IFS and immediately sets IFS equal to the 2/m×slot time. At time period "5T", the IFS adaptation routine recognizes that the collision intensity still remains above the collision intensity threshold and thus, stops the IFS adaptation in light of the fact that the IFS is equal to the round trip delay. The calculated IFS remains unchanged until 18T. At 18T, the IFS adaptation routine recognizes that the transmit activity has fallen below the transmit activity threshold and therefore stops to calculate the collision intensity and goes back to the minimal IFS. As a result of this behavior, the Ethernet network achieves its maximal performance at 4T and remains on the same level until end of the BtB frame transmissions.

Figure 5:
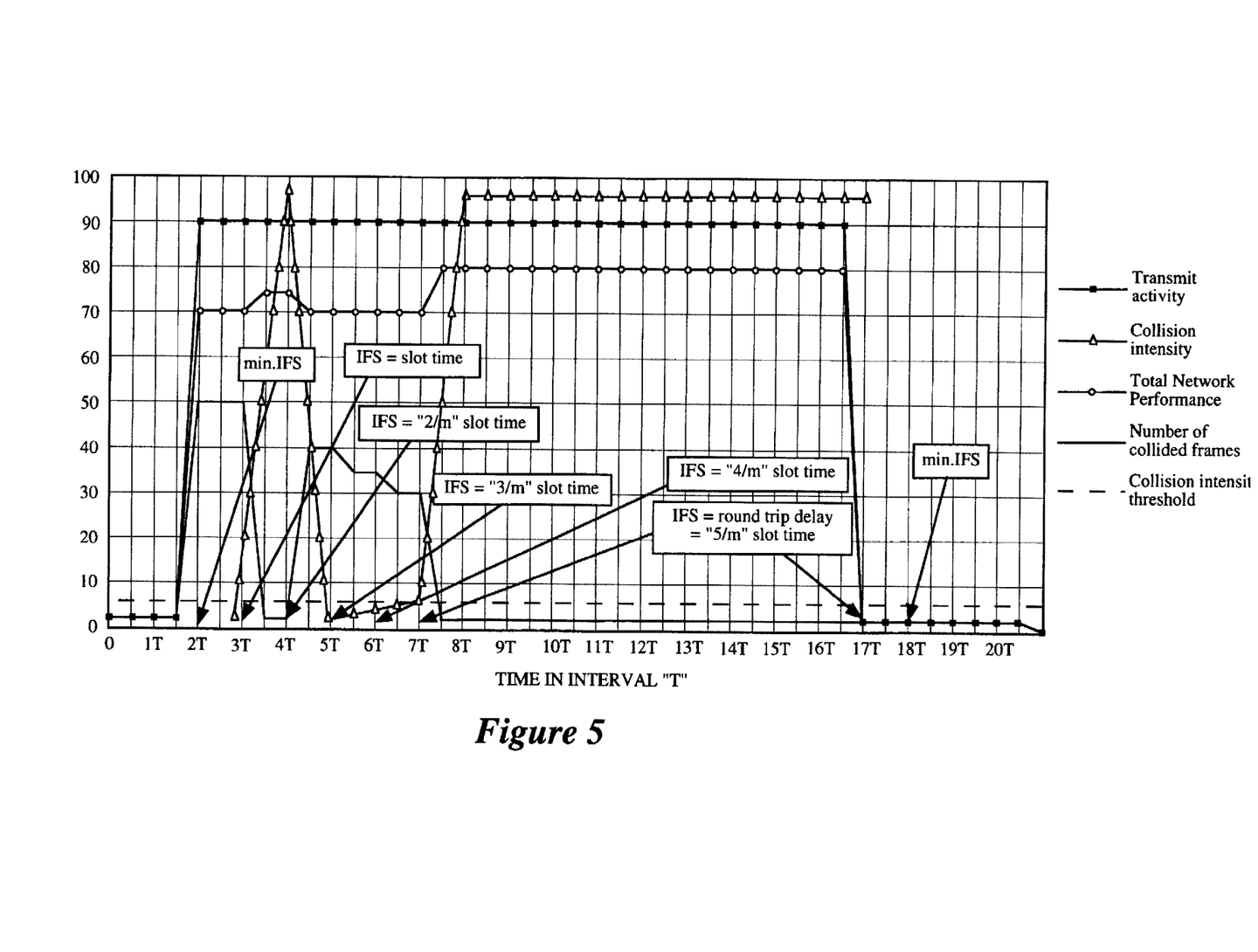
FIG. 5 is a detailed illustration of operations of the IFS adaptation routine for an Ethernet network having a topology where the round trip delay between the first and second stations is equal to "5/m" multiplied by the slot time, where "1/m" is equal to the incremental IFS value.

Referring now to FIG. 5, an illustrative graph of operations of the IFS adaptation routine for an Ethernet network having a relatively long topology is shown where the round trip delay between the first and second stations is equal to 5/m×slot time, when 1/m×slot time is equal to the IFS delay increment. As discussed above, the Y-axis numbers are abstract and have only illustrative meaning while the transmit activity threshold and the collision intensity threshold are 80 and 5, respectively. At 2T when the transmit activity becomes more than 80 and the collision intensity less than 5, the IFS adaptation routine starts at 3T and tests if the collision intensity is responsive to the IFS adjustment. As discussed above, such testing is accomplished by setting the IFS equal to the slot time at 3T and determining whether the collision intensity has increased above the collision intensity threshold by 4T. At this point, the IFS adaptation routine alters the IFS by immediately setting IFS equal to a preselected IFS delay which, as shown, is 2/m×slot time.

At time period 5T–7T, the collision intensity still remains below the collision intensity threshold requiring the IFS adaptation routine to modify the IFS in increments of 1/m×slot time at each time period 5T–7T. At 8T, the IFS adaptation routine detects that the collision intensity has risen above its collision intensity threshold and stops the IFS adaptation so that IFS is equal to ⅝ slot time. The calculated IFS remains unchanged until 18T where the IFS adaptation routine recognizes that transmit activity has fallen below its threshold and therefore stops to calculate the collision intensity and goes back to the minimal IFS. As a result of this behavior, the Ethernet network achieves its optimal performance at 7T and remains on the same level until end of frame transmissions.

Figure 6:
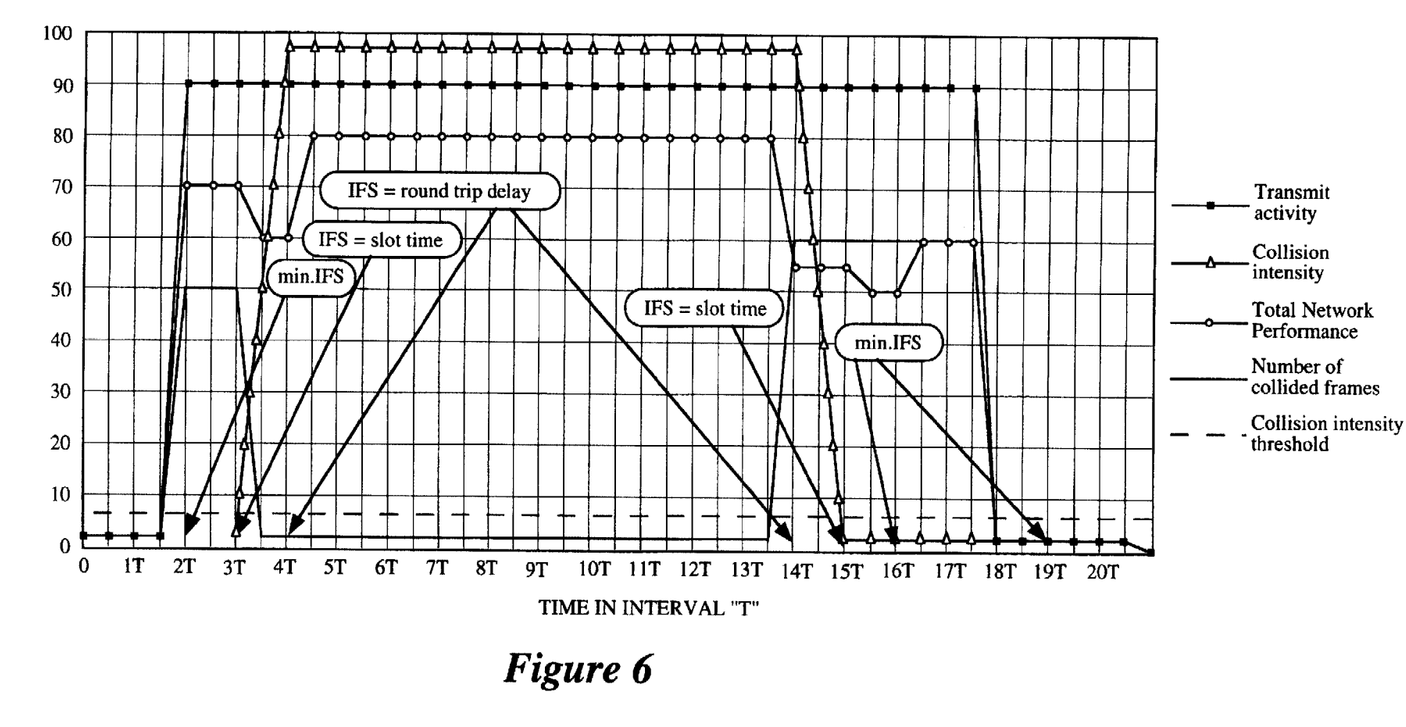
FIG. 6 is a detailed illustration of the operations of the IFS adaptation routine for an Ethernet network having a topology where the round trip delay between the first and second stations is equal to "2/m" multiplied by the slot time and experiencing a change in the topology at time period T14.

Referring to FIG. 6, an illustrative graph of operations of the IFS adaptation routine for an Ethernet network having a relatively short topology is shown where the round trip delay between the first and second stations is equal to 2/m×slot time, where "1/m×slot time" is equal to the IFS delay increment. The transmit activity and collision intensity thresholds are set to be 80 and 5, respectively. When the transmit activity becomes more than 80 and the collision intensity less than 5 at time period 2T, the IFS adaptation routine starts at the 3T and tests if the collision intensity is responsive to the IFS adjustment by setting IFS equal to an entire slot time value at 3T and checking if the collision intensity has risen above the collision intensity threshold at 4T. If so, as shown, the IFS adaptation routine decides to modify the IFS and immediately sets IFS equal to the 2/m×slot time. At time period 5T, the IFS adaptation routine recognizes that the collision intensity remains above the collision intensity threshold and, in response, stops further IFS adaptation. The current value of the IFS remains unchanged until 14T.

At time period 14T, the IFS adaptation routine recognizes that collision intensity has fallen below the collision intensity threshold while IFS is set to "2/m×slot time". Typically, this is caused through reconfiguration of the Ethernet network. In response, the IFS adaptation routine immediately checks for collision sensitivity of the BtB frames by increasing the IFS to be equal to the slot time at 15T. At 16T, the IFS adaptation routine determines that the collision intensity has not risen above the collision intensity threshold and immediately resets the IFS back to the minimal value. As a result, during this transaction, the IFS adaptation routine improves performance of the Ethernet network at two different occasions. The first occasion is at 4T setting IFS equal to the round trip delay ("2/m×slot time") and the second occasion is resetting the IFS to its minimal value at 16T.

Figure 7:
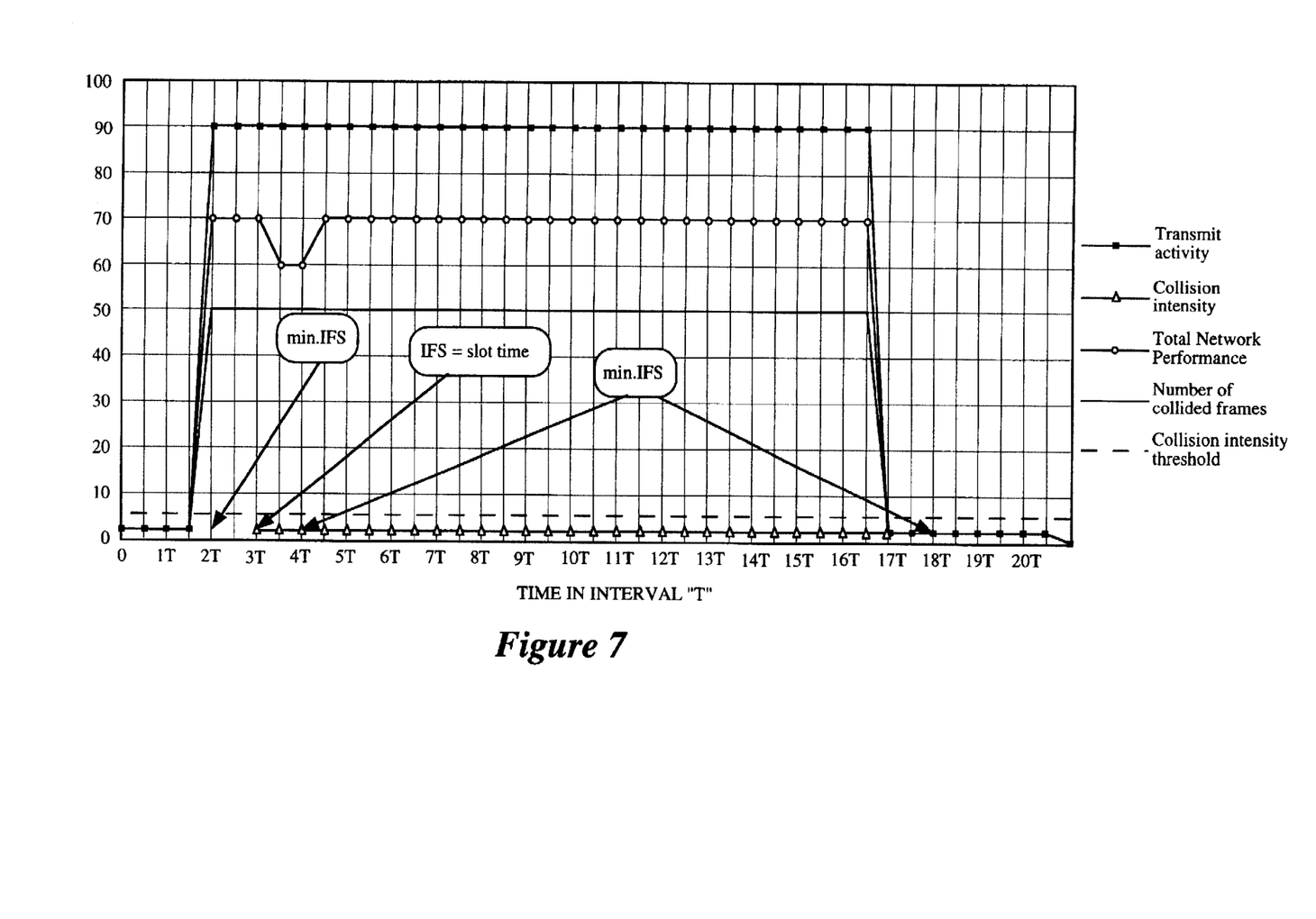
FIG. 7 is a detailed illustration of the operations of the IFS adaptation routine for an Ethernet network having a topology insensitive to IFS adaptation.

As shown in FIG. 7, an illustrative graph of the operations of the IFS adaptation routine for an Ethernet network having a load insensitive to IFS adaptation is shown. For illustrative purposes, the transmit activity and collision intensity thresholds are set to be 80 and 5, respectively. At 2T, when the transmit activity becomes more than 80 and the collision intensity less than 5, the IFS adaptation routine starts at time period 3T and tests if the collision intensity is responsive to the IFS adjustment by setting IFS equal to the slot time. At 4T, the IFS adaptation routine checks whether the collision intensity has risen above the collision intensity threshold. As shown, since modification of the IFS has no effect on the collision intensity, the IFS adaptation routine resets the IFS to its minimal value.

The present invention described herein may be designed in many different embodiments as evident to one skilled in the art than those described without departing from the spirit and scope of the present invention. The invention should, therefore be measured in terms of the claims which follow.

What is claimed is:

1. A method for altering Inter Frame Spacing to improve performance of a network, the method comprising the steps of:

ascertaining a transmit activity of the network; and checking whether said transmit activity is greater than or equal to a transmit activity threshold, wherein if said transmit activity is greater than or equal to said transmit activity threshold, then (i) ascertaining a collision intensity experienced by the network, and (ii) adjusting the Inter Frame Spacing until said collision intensity rises above a collision intensity threshold, and if said transmit activity is less than said transmit activity threshold, then setting the Inter Frame Spacing to a minimum Inter Frame Spacing delay associated with the network.

2. The method according to claim 1, wherein prior to said adjusting step, further comprises a step of determining whether the network is responsive to an increase in the Inter Frame Spacing.

3. The method according to claim 2, wherein said determining step includes the steps of setting the Inter Frame Spacing equal to a slot time of the network during a first access;

ascertaining said collision intensity during a second access subsequent to said first access; and comparing said collision intensity during said second access with said collision intensity threshold to conclude the network is responsive if said collision intensity is greater than or equal to said collision intensity threshold.

4. The method according to claim 1, wherein said adjusting step includes the steps of setting the Inter Frame Spacing equal to a preselected Inter Frame Spacing delay; and checking whether said collision intensity for the network having said preselected Inter Frame Spacing delay is greater than or equal to said collision intensity threshold, wherein if said collision intensity threshold is greater than or equal to said collision intensity threshold, halting adjustment of the Inter Frame Spacing until said collision intensity falls below said collision intensity threshold, and if said collision intensity is less than said collision intensity threshold, increasing said preselected Inter Frame Spacing delay by a single Inter Frame Spacing delay increment, and reporting said checking step.

5. The method according to claim 1, wherein said adjusting step is performed in real-time.

6. A network comprising:

a network medium;

a first station coupled to said network medium; and a second station coupled to said network medium, said second station including a network controller used to regulate data throughput from said second station onto said network medium, and a memory element coupled to said network controller, said memory element including a network device driver configured to ascertain a transmit activity of the network, to ascertain a collision intensity experienced by the network when the transmit activity is equal to or exceeds a transmit activity threshold, and to modify an Inter Frame Spacing used by said network controller until the collision intensity threshold rises above a collision intensity threshold.

7. The network according to claim 6, wherein the memory element is main memory.

8. The network according to claim 6, wherein the memory element is local memory, implemented with said network controller within a network interface of said second station.

9. The network according to claim 6, wherein said network device driver includes an Inter Frame Spacing adaptation routine executed by the second station to modify the Inter Frame Spacing in real-time.

10. The network according to claim 6, wherein said network driver further (iv) sets the Inter Frame Spacing to a minimum Inter Frame Spacing delay when said transmit activity is less than a transmit activity threshold.

11. The network according to claim 6, wherein, prior to adjusting the Inter Frame Spacing used by the network controller, said network device driver determines whether the network is responsive to an increase in the Inter Frame Spacing.

12. The network according to claim 11, wherein said network device driver determines whether the network is responsive to the increase in the Inter Frame Spacing by (i) setting the Inter Frame Spacing equal to a slot time of the network during a first access, (ii) calculating said collision intensity during a second access subsequent to said first access, and (iii) comparing said collision intensity during said second access with, a collision intensity threshold to conclude the network is responsive if said collision intensity is greater than or equal to said collision intensity threshold.

13. A network comprising:

bus means for propagating data frames;

first communicative means for receiving said data frames through said bus means, said first communicative means being coupled to said bus means; and second communicative means for transmitting said data frames, said second communicative means being coupled includes controller means for regulating throughput of said data frames onto said bus means, and memory means for storing an Inter Frame Spacing adaptation routine to configure an Inter Frame Spacing used by said controller means, the Inter Frame Spacing of the controller means being adjusted until a collision experienced by the network rises above a collision intensity threshold when the Inter Frame Spacing adaptation routine is executed and a transmit activity is greater than or equal to a transmit activity threshold.

14. The network according to claim 13, wherein the memory means is local memory implemented within said controller means within a network interface of said second communicative means thereby coupling said second communicative means to said bus means.

15. The network according to claim 13, wherein the memory means is main memory.

16. The network according to claim 13, wherein said controller means regulates throughput of said data frames in real-time.

17. A network comprising:

a network medium;

a first station coupled to said network medium; and a second station coupled to said network medium, said second station including a network controller used to regulate data throughput from said second station onto said network medium, and a memory element coupled to said network controller, said memory element including a network device driver including an Inter Frame Spacing adaptation routine being executed to modify the Inter Frame Spacing in real-time by ascertaining a transmit activity and a collision intensity when the transmit activity is greater than or equal to a transmit activity threshold, and by adjusting the Inter Frame Spacing until the collision intensity rises above a collision intensity threshold.

* * * * *

UNITED STATES PATENT AND TRADEMARK OFFICE
CERTIFICATE OF CORRECTION

PATENT NO. : 5,642,360
DATED : June 24, 1997
INVENTOR(S) : Solomon Trainin It is certified that error appears in the above-identified patent and that said Letters Patent is hereby corrected as shown below:

In column 2 at line 6 delete "flames" and insert --frames--

Signed and Sealed this

Twenty-third Day of September, 1997

BRUCE LEHMAN

*Attest:*

*Attesting Officer*     Commissioner of Patents and Trademarks